United States Patent
Bulatow et al.

(10) Patent No.: US 9,634,526 B2
(45) Date of Patent: Apr. 25, 2017

(54) ROTOR FOR A ROTATING ELECTRIC MACHINE AND ROTATING ELECTRIC MACHINE

(71) Applicant: Continental Automotive GmbH, Hannover (DE)

(72) Inventors: Michael Bulatow, Berlin (DE); Knut Welke, Falkensee (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 422 days.

(21) Appl. No.: 14/373,605

(22) PCT Filed: Jan. 23, 2013

(86) PCT No.: PCT/EP2013/051231
§ 371 (c)(1),
(2) Date: Jul. 21, 2014

(87) PCT Pub. No.: WO2013/110652
PCT Pub. Date: Aug. 1, 2013

(65) Prior Publication Data
US 2015/0035394 A1 Feb. 5, 2015

(30) Foreign Application Priority Data

Jan. 26, 2012 (DE) .................... 20 2012 000 842 U
Feb. 16, 2012 (DE) .................... 20 2012 003 120 U
(Continued)

(51) Int. Cl.
H02K 7/00 (2006.01)
H02K 1/02 (2006.01)
(Continued)

(52) U.S. Cl.
CPC ............... *H02K 1/02* (2013.01); *C22C 38/02* (2013.01); *C22C 38/04* (2013.01); *C22C 38/40* (2013.01);
(Continued)

(58) Field of Classification Search
CPC .................................. H02K 1/02; H02K 3/51
(Continued)

(56) References Cited

U.S. PATENT DOCUMENTS

| 3,008,786 A | 11/1961 | Costello | 310/214 |
| 3,311,511 A | 3/1967 | Goller | 148/597 |

(Continued)

FOREIGN PATENT DOCUMENTS

| CH | 203736 A | 3/1939 | ............... H02K 3/51 |
| CH | 620060 A5 | 10/1980 | ............. H02K 3/487 |

(Continued)

OTHER PUBLICATIONS

Chinese Office Action, Application No. 201380006876.0, 12 pages, Aug. 17, 2016.
(Continued)

*Primary Examiner* — Thanh Lam
(74) *Attorney, Agent, or Firm* — Slayden Grubert Beard PLLC

(57) ABSTRACT

A rotor for a rotating electric machine includes a rotor sheet stack arranged on a rotor shaft, and at least one metallic functional component made of a material comprising iron and also chromium in a proportion of at least 18% and at most 19% by weight and optionally nickel in a proportion of at least 12% and not more than 13% by weight.

18 Claims, 4 Drawing Sheets

(30) Foreign Application Priority Data

| | | | |
|---|---|---|---|
| Feb. 28, 2012 | (DE) | ................... | 20 2012 002 024 U |
| Feb. 28, 2012 | (DE) | ................... | 20 2012 002 027 U |
| Apr. 10, 2012 | (DE) | ................... | 20 2012 003 643 U |

(51) Int. Cl.
  *C22C 38/40* (2006.01)
  *H02K 3/487* (2006.01)
  *H02K 3/51* (2006.01)
  *H02K 15/16* (2006.01)
  *C22C 38/02* (2006.01)
  *C22C 38/04* (2006.01)
  *H02K 11/21* (2016.01)

(52) U.S. Cl.
  CPC ............. *H02K 3/487* (2013.01); *H02K 3/51* (2013.01); *H02K 11/21* (2016.01); *H02K 15/165* (2013.01); *H02K 2213/03* (2013.01)

(58) Field of Classification Search
  USPC .............................................. 310/43–45, 66
  See application file for complete search history.

(56) References Cited

U.S. PATENT DOCUMENTS

| | | | | |
|---|---|---|---|---|
| 3,480,810 | A | | 11/1969 | Potter .............................. 310/54 |
| 3,991,152 | A | | 11/1976 | Santi et al. ................... 264/161 |
| 4,147,946 | A | | 4/1979 | Linscott, Jr. et al. ......... 310/214 |
| 4,149,101 | A | | 4/1979 | Lesokhin et al. ............. 310/214 |
| 4,413,405 | A | | 11/1983 | Doke et al. ..................... 29/596 |
| 4,933,583 | A | | 6/1990 | Ripplinger ............... 310/156.22 |
| 5,036,238 | A | | 7/1991 | Tajima .......................... 310/214 |
| 5,127,148 | A | | 7/1992 | Lykes et al. .................... 29/596 |
| 5,498,916 | A | | 3/1996 | Lindner et al. ............... 310/214 |
| 5,684,352 | A | * | 11/1997 | Mita ........................ H02K 1/02 |
| | | | | 310/152 |
| 5,838,080 | A | | 11/1998 | Couderchon et al. ..... 310/49.33 |
| 5,973,432 | A | | 10/1999 | Katagiri et al. .............. 310/214 |
| 6,190,465 | B1 | | 2/2001 | Coutu et al. .................. 148/315 |
| 6,222,286 | B1 | * | 4/2001 | Watanabe ............... H02K 1/02 |
| | | | | 310/257 |
| 6,225,723 | B1 | | 5/2001 | Cooper et al. ................ 310/214 |
| 6,350,324 | B1 | | 2/2002 | Waeckerle et al. ........... 148/311 |
| 6,759,771 | B2 | | 7/2004 | Doherty et al. ................ 310/58 |
| 6,933,648 | B2 | | 8/2005 | Buchan et al. ............... 310/214 |
| 7,687,963 | B2 | | 3/2010 | Klaussner ..................... 310/214 |
| 7,743,498 | B2 | | 6/2010 | Rhodes ........................ 29/888.3 |
| 7,875,132 | B2 | | 1/2011 | Pandey ......................... 148/415 |
| 8,237,318 | B2 | | 8/2012 | Ikitake et al. ............... 310/68 B |
| 8,536,746 | B2 | | 9/2013 | Kuhnen et al. ................. 310/72 |
| 8,729,887 | B2 | | 5/2014 | Suzuki et al. ........... 324/207.16 |
| 2003/0184180 | A1 | | 10/2003 | Doherty et al. .............. 310/214 |
| 2003/0193256 | A1 | | 10/2003 | Liebermann .................. 310/194 |
| 2005/0212373 | A1 | | 9/2005 | Mcdowall et al. ........... 310/214 |
| 2007/0120429 | A1 | | 5/2007 | Howard et al. ................. 310/61 |
| 2008/0238237 | A1 | * | 10/2008 | Nishihama ............... H02K 1/06 |
| | | | | 310/166 |
| 2010/0041939 | A1 | | 2/2010 | Siess .............................. 600/16 |
| 2010/0102910 | A1 | | 4/2010 | Waeckerle et al. ........... 335/297 |
| 2010/0141056 | A1 | * | 6/2010 | Miyahara ................ F02G 1/053 |
| | | | | 310/30 |
| 2013/0147307 | A1 | | 6/2013 | Morooka et al. ............. 310/215 |

FOREIGN PATENT DOCUMENTS

| | | | | |
|---|---|---|---|---|
| CN | 1220050 A | 6/1999 | ............ | H01F 27/28 |
| CN | 1873035 A | 12/2006 | ............ | B22D 21/00 |
| CN | 101031744 A | 9/2007 | ............ | F16J 15/32 |
| CN | 101680070 A | 3/2010 | ............ | C22C 19/00 |
| CN | 102055295 A | 5/2011 | ............ | H02K 11/00 |
| DE | 1925625 A1 | 3/1970 | ............ | H02K 9/19 |
| DE | 2817951 A1 | 12/1978 | ............ | H02K 1/24 |
| DE | 3808311 A1 | 9/1989 | ............ | H02K 1/27 |
| DE | 3901230 C1 | 7/1990 | ............ | H02K 15/12 |
| DE | 19623460 A1 | 12/1997 | ............ | H02K 15/14 |
| DE | 69904367 T2 | 10/2003 | ............ | C21D 6/00 |
| DE | 19808659 B4 | 3/2004 | ............ | H02K 15/12 |
| DE | 69721671 T2 | 3/2004 | ............ | C22C 38/00 |
| DE | 10244201 A1 | 4/2004 | ............ | H02K 15/00 |
| DE | 60010167 T2 | 8/2005 | ............ | C22C 30/00 |
| DE | 102005030877 A1 | 1/2007 | ............ | H02K 3/487 |
| DE | 602004005631 T2 | 12/2007 | ............ | H02K 3/487 |
| DE | 102007014224 A1 | 9/2008 | ............ | A61M 1/10 |
| DE | 202009008646 U1 | 11/2010 | ............ | H02K 11/00 |
| DE | 102009023691 A1 | 12/2010 | ............ | G01B 7/30 |
| DE | 112009000845 T5 | 4/2011 | ............ | H02K 11/00 |
| DE | 102009046716 A1 | 5/2011 | ............ | H02K 1/27 |
| DE | 102009051979 A1 | 6/2011 | ............ | H02K 11/00 |
| EP | 0543280 B1 | 5/1993 | ............ | H02K 3/487 |
| EP | 0562534 A1 | 9/1993 | ............ | H02K 1/06 |
| EP | 0889488 A1 | 1/1999 | ............ | C21D 6/00 |
| EP | 1005135 A1 | 5/2000 | ............ | H02K 1/24 |
| EP | 1967289 A2 | 9/2008 | ............ | B05D 7/14 |
| EP | 2113988 A1 | 11/2009 | ............ | H02K 15/16 |
| EP | 2296256 A2 | 3/2011 | ............ | H02K 3/52 |
| GB | 2339798 A | 2/2000 | ............ | H01F 1/147 |
| JP | 9322457 A | 12/1997 | ............ | H02K 3/487 |
| JP | 2002112488 A | 4/2002 | ............ | H02K 21/14 |
| WO | 2013/110580 A1 | 8/2013 | ............ | H02K 3/487 |
| WO | 2013/110652 A1 | 8/2013 | ............ | H02K 11/00 |
| WO | 2013/110656 A1 | 8/2013 | ............ | H02K 3/487 |

OTHER PUBLICATIONS

Chinese Office Action, Application No. 201380006878.X, 14 pages, May 20, 2016.
Chinese Office Action, Application No. 201380006877.5, 13 pages, Feb. 3, 2016.
Chinese Office Action, Application No. 201380006876.0, 12 pages, Feb. 16, 2016.
International Search Report and Written Opinion, Application No. PCT/EP2013/051231, 12 pages, Jun. 3, 2013.
International Search Report and Written Opinion, Application No. PCT/EP2013/051235, 11 pages, Jun. 3, 2013.
International Search Report and Written Opinion, Application No. PCT/EP2013/051085, 11 pages, Jun. 4, 2013.
U.S. Non-Final Office Action, U.S. Appl. No. 14/373,503, 26 pages, Nov. 3, 2016.
U.S. Non-Final Office Action, U.S. Appl. No. 14/373,577, 26 pages, Dec. 30, 2016.
Chinese Office Action, Application No. 201380006878.X, 13 pages, Jan. 25, 2017.
Chinese Office Action, Application No. 201380006876.0, 12 pages, Jan. 25, 2017.

* cited by examiner

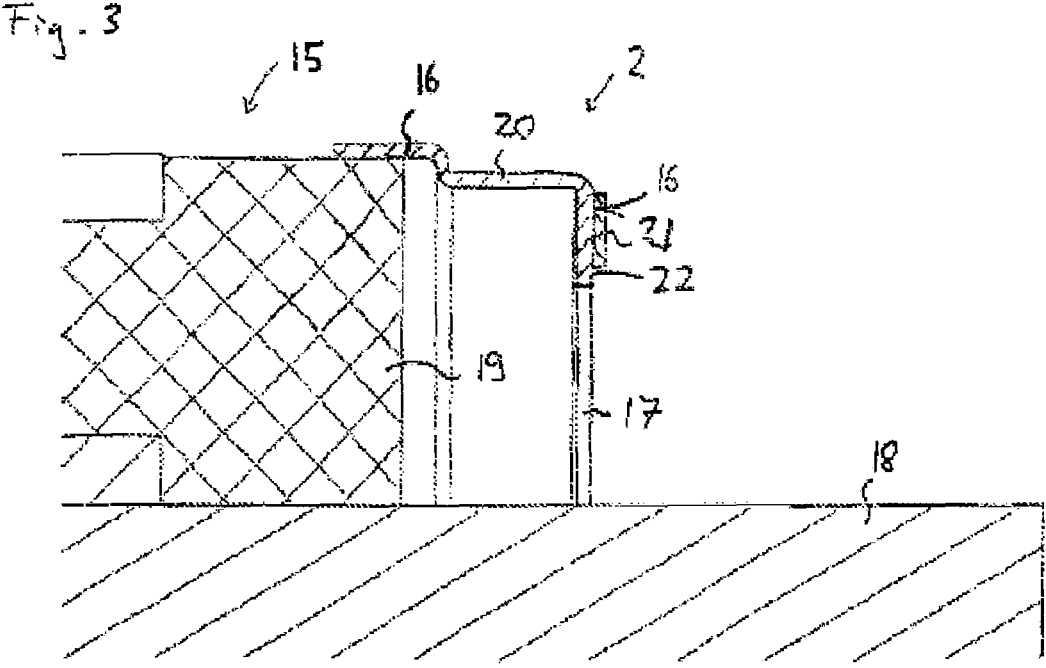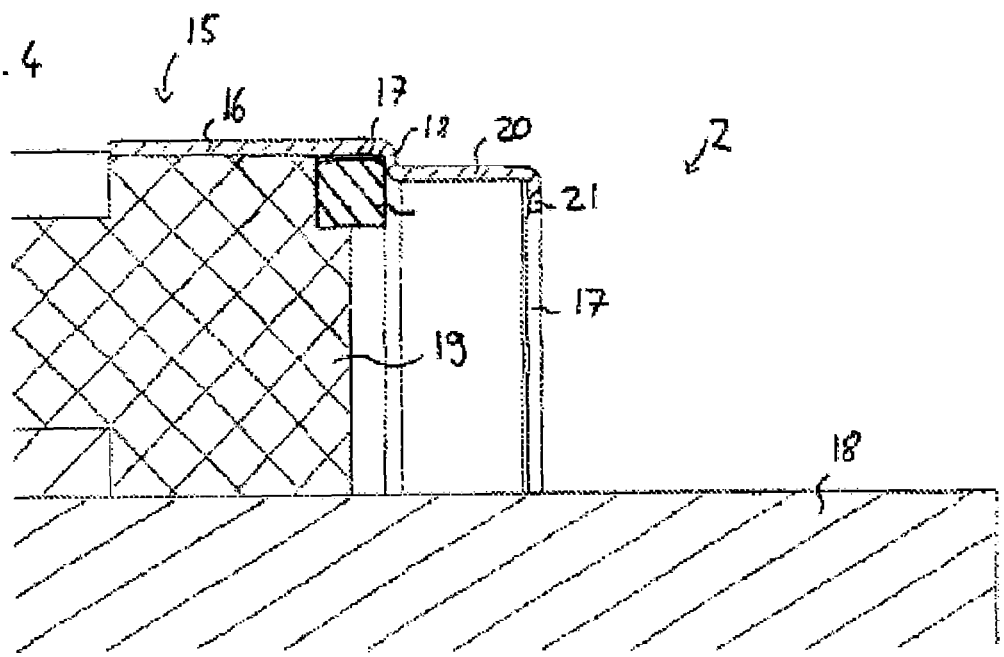

Fig. 5

| %C | %Si | %Mn | %P | %S | %N | %Cr | %Ni |
|---|---|---|---|---|---|---|---|
| ≤ 0.055 | ≤ 0.6 | ≤ 1.4 | ≤ 0.04 | ≤ 0.008 | ≤ 0.1 | 18.0 - 19.0 | 12.0 - 13.0 |

ROTOR FOR A ROTATING ELECTRIC MACHINE AND ROTATING ELECTRIC MACHINE

CROSS-REFERENCE TO RELATED APPLICATIONS

This application is a U.S. National Stage Application of International Application No. PCT/EP2013/051231 filed Jan. 23, 2013, which designates the United States of America, and claims priority to DE Application No. 20 2012 000 842.0 filed Jan. 26, 2012, DE Application No. 20 2012 003 120.1 filed Feb. 16, 2012, DE Application No. 20 2012 002 027.7 filed Feb. 28, 2012, DE Application No. 20 2012 002 024.2 filed Feb. 28, 2012, and DE Application No. 20 2012 003 643.2 filed Apr. 10, 2012, the contents of which are hereby incorporated by reference in their entirety.

TECHNICAL FIELD

The present invention relates to a rotor for a rotating electric machine, in particular for an electric motor or a generator.

BACKGROUND

Electric motors are increasingly installed in modern motor vehicles. Said electric motors are used in this context, in particular, as drive motors which are fully integrated in the drive train or, for example, as starter generators or axle-mounted motors in hybrid applications. In this context, partially externally excited synchronous machines are used which have a rotor composed of a laminated core provided with an exciter winding. In such rotors, grooves are formed between the wound pole teeth.

During operation, high centrifugal forces, which can pull the exciter winding out of the grooves, occur both in the case of internal rotors as well as in the case of external rotors. The centrifugal forces are dependent on the rotational speed and on the weight of the groove-internal components. In particular, in the case of revving up machines the winding is therefore additionally secured after assembly. For this purpose, various bonding means are known which are used as impregnating resins or casting compounds. In addition, groove stoppers or groove wedges can be used in order to prevent the winding dropping out of the groove. Such groove wedges are known, for example, from document DE 28 17 951 A1.

In addition to externally excited synchronous machines, asynchronous machines are also installed; in particular, permanently excited synchronous machines are also used as starter generators.

So that eddy current losses which occur during operation are reduced, components of electric machines are partially fabricated from non-magnetizable materials. For example, non-magnetizable and stainless steels are used, which are also known as "Nirosta" steels (for example steel 1.4301 and 1.4303 according to the material designation according to the European standard). However, the austenitic structure of said steels is changed during shaping, punching or cutting, with the result that the steels can become magnetizable.

For many components it would also be conceivable to use plastics. However, as a rule these do not have the necessary mechanical properties to withstand high centrifugal forces.

SUMMARY

One embodiment provides a rotor for a rotating electric machine, which rotor has a rotor laminated core which is arranged on a rotor shaft, wherein the rotor also has at least one metallic functional component, wherein the at least one functional component is constructed from a material that includes iron, and chromium in a proportion of at least 18 and at most 19% by weight.

In a further embodiment, the material of the at least one functional component also includes nickel in a proportion of at least 12% and at most 13% by weight.

In a further embodiment, the at least one functional component is embodied as a balancing element.

In a further embodiment, the at least one functional component is embodied as an encoder wheel of a rotor position encoder.

In a further embodiment, the rotor is embodied as a rotor of an externally excited synchronous machine and has the following: a number of pole teeth which support an exciter winding; and grooves are formed between each of the pole teeth.

In a further embodiment, the at least one functional component is embodied as a winding head cover of the exciter winding.

In a further embodiment, the functional components are embodied as groove wedges which are arranged in the grooves and close off the grooves from the outside.

In a further embodiment, the exciter winding is surrounded by a casting compound.

In a further embodiment, the cavities inside the grooves are cast essentially completely with a casting compound.

Another embodiment provides a rotating electric machine having a rotor as disclosed above.

BRIEF DESCRIPTION OF THE DRAWINGS

Example embodiments are explained in more detail below with reference to the drawings, in which:

FIG. 1 is a schematic view of a cross section through an electric motor with a rotor according to a first embodiment of;

FIG. 3 is a schematic view of a longitudinal section through a region of the rotor according to a second embodiment;

FIG. 4 is a schematic view of a longitudinal section through a region of the rotor according to a third embodiment, and FIG. 5 shows a table with an alloy composition according to an embodiment.

DETAILED DESCRIPTION

Figure 1:
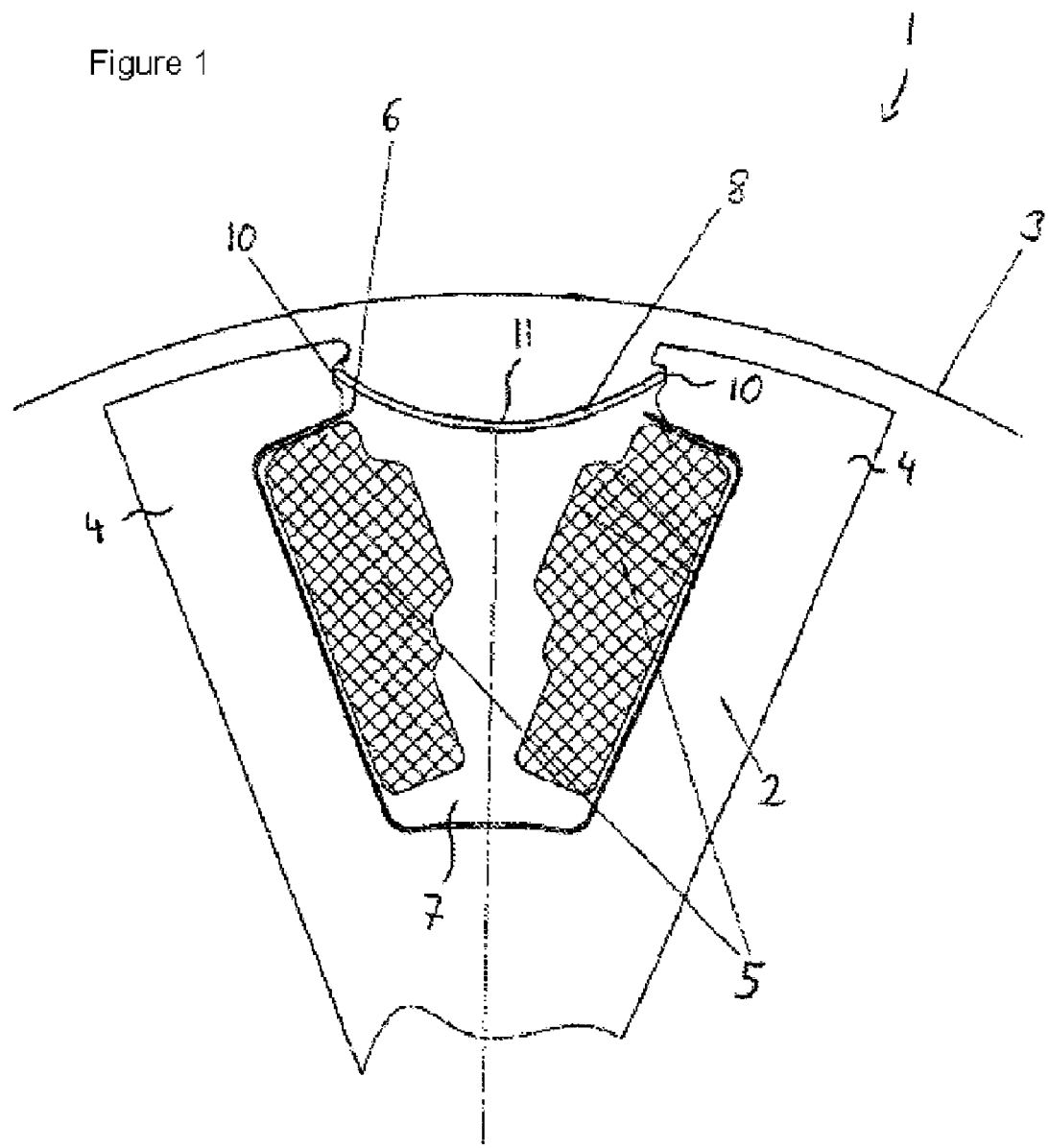

Embodiments of the invention provide a rotor for a rotating electric machine which has, on the one hand, low eddy current losses and, on the other hand, is also sufficiently stable for it also to be able to be used for high rotational speeds.

According to one embodiment, a rotor for a rotating electric machine is specified, which rotor has a rotor laminated core which is arranged on a rotor shaft, wherein the rotor also has at least one metallic functional component, wherein the functional component is constructed from a material which has iron, and chromium in a proportion of at least 18 and at most 19% by weight, as well as nickel in a proportion of at least 12 and at most 13% by weight.

A functional component is understood here and below to be a component such as, for example, an encoder wheel of a rotor position encoder, housing parts, balancing elements, winding head covers or groove wedges.

In particular, the material can essentially have the alloy composition $Fe_{rem}Cr_aNi_bMn_cC_dSi_eP_fS_gN_h$, wherein a, b, c, d, e, f, g and h are specified in percent by weight and $18 \leq a \leq 19$; $12 \leq b \leq 13$; $0 \leq c \leq 1.4$; $0 \leq d \leq 0.055$; $0 \leq e \leq 0.6$; $0 \leq f \leq 0.04$; $0 \leq g \leq 0.008$ and $0 \leq h \leq 0.1$. In addition, the material can have impurities with other materials, which are typical of fabrication.

Compared to known stainless steels, for example steels 1.4301 or 1.4303, this material has a particularly high proportion of chromium and nickel. It has been found that, in contrast to work pieces made of known stainless steels, work pieces made of this steel remain non-magnetizable even after shaping, punching or cutting owing to the relatively high proportion of chromium and nickel in this steel.

This material is accordingly suitable for functional components of an electric motor which are frequently manufactured by methods such as deep-drawing, punching or turning and in the process experience considerable shaping. Retaining the non-magnetizability even during such processes reduces eddy current losses.

This steel is additionally sufficiently strong for the functional components to have the strength which is necessary for high loads.

Such a rotor is therefore also suitable for high rotational speeds of 10,000 revolutions per minute and more.

In one embodiment, the at least one functional component is embodied as a balancing element.

A balancing element is understood to be a component from which material can be removed or to which material can be added during balancing compensation on the rotor until the center of gravity in the balancing planes is approximately at the rotational axis of the rotor. Such balancing compensation is typically carried out because after its fabrication the rotor is not completely rotationally symmetrical owing to tolerances in the components and owing to unavoidable irregularities in the fabrication processes. A plurality of balancing elements can also be provided on a rotor, said balancing elements being frequently embodied as balancing rings which are arranged concentrically with respect to the rotor shaft.

In one embodiment, the at least one functional component is embodied as an encoder wheel of a rotor position encoder.

The encoder wheel of the rotor position encoder has an encoder contour, also referred to as a sensor track, which forms the sensor, together with a sensor element which is arranged in a positionally fixed fashion on the motor housing and accordingly does not rotate with the rotor.

In one embodiment, the rotor is embodied as a rotor of an externally excited synchronous machine and has a number of pole teeth which support an exciter winding. Grooves are formed between each of the pole teeth.

In one embodiment, the at least one functional component is embodied as a winding head cover of the exciter winding.

The winding head cover is understood here and below to be a cover of the winding heads of the exciter winding of the rotor which closes off the rotor laminated core in the axial direction. Winding head covers can be provided at both ends of the rotor.

In one embodiment, the functional components are embodied as groove wedges which are arranged in the grooves and close off the grooves from the outside.

The groove wedges additionally secure the exciter windings during operation. They can be clamped tight in a dimensionally stable fashion in the pole teeth. For this purpose, recesses are provided as securing means in the pole teeth, which securing means hold the edge sections of the groove wedges.

In one embodiment, the exciter winding is surrounded by a casting compound. For this purpose, after the assembly of the rotor after the windings and the groove wedges have been mounted the electrically insulating casting compound, for example a casting resin or epoxy resin such as araldite or a plastic, is introduced into the cavities inside the grooves of the rotor and cures. In one embodiment, the cavities inside the grooves are cast essentially completely with a casting compound.

In such rotors, the groove-internal components, in particular the exciter winding, are particularly well secured against centrifugal forces which occur during operation.

Alternatively, the exciter winding can also be surrounded by an impregnating compound, for example an impregnating resin. During impregnation, the rotor is dipped into the impregnating compound and subsequently dried. In this context, all the groove components are bonded together and the rest of the impregnating compound drips off. The rotor grooves are typically not completely filled in this context.

The functional components which are constructed from the material which has, in addition to iron, chromium in a proportion of at least 18 and at most 19% by weight as well as nickel in a proportion of at least 12 and at most 13% by weight, can also include components of the electric machine, such as, for example the rotor laminated core in itself, the rotor shaft, the end plate, the balancing ring but also the stator laminated core, the stator housing, etc.

Other embodiments provide an electric motor with the described rotor is specified. The electric motor can be embodied, in particular, as an externally excited synchronous machine. It can be embodied either as an internal rotor or as an external rotor. The electric motor can also be embodied as a permanently excited synchronous machine or as an asynchronous machine.

Since the groove-internal components are effectively secured against centrifugal forces which occur and the functional components of the rotor have a high level of strength, the electric motor can be configured for rotational speeds of 10,000 revolutions per minute and more.

Such electric motors are suitable for use in a motor vehicle. They can be used both as drive motors which are fully integrated in the drive train, for example wheel hub motors or axle-mounted motors or, for example, as starter generators. According to one embodiment, a motor vehicle is therefore specified which has the described electric motor. The motor vehicle can be embodied here as an electric vehicle or hybrid vehicle.

FIG. 1 is a schematic view of a cross section through an electric motor 1 with a rotor 2 which is embodied as a laminated core and a stator 3 which surrounds the rotor 2.

In the embodiment shown, the electric motor 1 is embodied as an externally excited synchronous machine. The rotor 2 has a number of pole teeth 4 between which grooves 7 are formed. The pole teeth 4 support exciter windings 5 which are electrically insulated from the pole teeth 4 by a groove-insulating paper 6. It is also possible to select another form of insulation, for example encapsulation by injection molding with a plastic.

The groove 7 is closed off from the outside by a groove wedge 8. The groove wedge 8 is formed from a non-magnetizable material and has the alloy composition $Fe_{rem}Cr_aNi_bMn_cC_dSi_eP_fS_gN_h$, where a, b, c, d, e, f, g and h are specified in percent by weight and 18≤a≤19; 12≤b≤13; 0≤c≤1.4; 0≤d≤0.055; 0≤e≤0.6; 0≤f≤0.04; 0≤g≤0.008 and 0≤h≤0.1.

In the embodiment shown, the groove wedge 8 is of concave design with a bulge 11 toward the interior of the rotor 2. The groove wedge 8 can, however, also have a convex shape or some other shape. With its edge regions, the groove wedge 8 is held in recesses 10 in the pole teeth 4 and secured. The groove wedge 8 additionally secures the exciter winding 5 against centrifugal forces which occur during operation.

Figure 2:
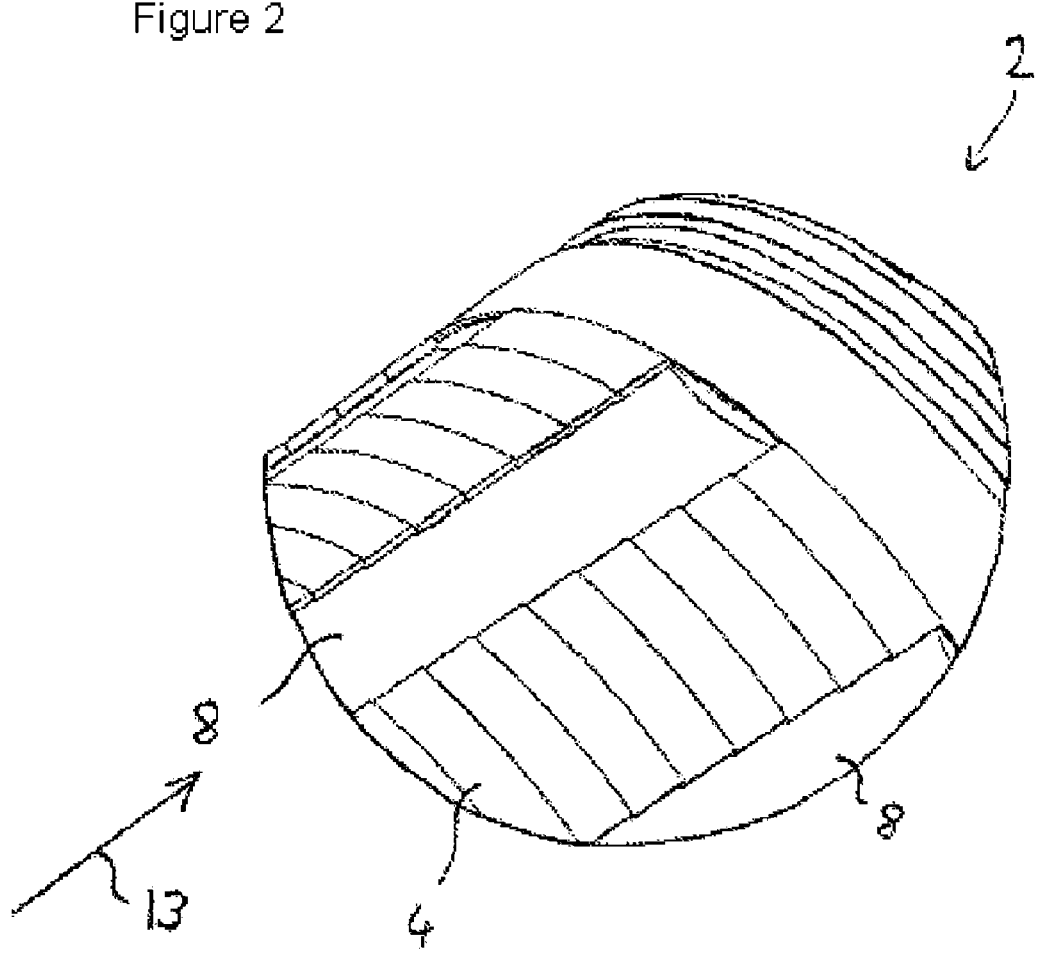
FIG. 2 is a schematic, perspective view of the electric motor according to FIG. 1.

FIG. 2 shows a perspective view of the rotor 2. In this view, the groove wedges 8 which extend between the pole teeth 4 can be seen. The groove wedges 8 extend axially, that is to say over the entire length of the groove 7 in the direction of the arrow 13. Such groove wedges 8 can also be provided in the case of oblique grooves 7 which then follow the oblique profile of the grooves 7.

The groove wedges 8 are mounted after the exciter windings 5 have been applied. Said groove wedges 8 can be mounted either axially or radially. In this context, both unbent pieces of sheet metal—for example unwound from the coil and shaped during assembly—as well as pre-bent parts can be used. After the assembly of the groove wedges 8, the remaining cavities of the grooves 7 are cast with a casting compound (not shown).

FIG. 3 is a schematic view of a longitudinal section through a region of the rotor 2 according to a second embodiment.

In the region of the winding heads 15, in each case a winding head cover 16 which is manufactured using a deep-drawing method is provided. Said winding head cover 16 surrounds both ends of the rotor laminated core and the exciter winding 5 and has a central opening 17 for feeding through the rotor shaft 18. The rotor shaft 18 is connected in a rotationally fixed fashion to the rotor 2 and is rotatably mounted in a housing (not shown) of the electric machine. A winding head cover 16 can also be provided at just one end of the rotor 2.

The winding head cover 16 closes off the rotor laminated core in the axial direction.

The winding head cover 16 is composed of an non-magnetizable steel with the alloy composition $Fe_{rem}Cr_aNi_bMn_cC_dSi_eP_fS_gN_h$, wherein a, b, c, d, e, f, g and h are specified in percent by weight and 18≤a≤19; 12≤b≤13; 0≤c≤1.4; 0≤d≤0.055; 0≤e≤0.6; 0≤f≤0.04; 0≤g≤0.008 and 0≤h≤0.1.

In order to stabilize the exciter winding during operation, the rotor 2 is cast in an injection molding method with a plastic compound 19. The exciter winding (not shown) is embedded in the plastic compound 19. The plastic compound 19 has a boundary face with the winding head cover 16.

The rotor 2 has an encoder wheel 20 of a rotor position encoder which is embodied in one piece with the winding head cover 16 in this embodiment. In this embodiment, an encoder contour 21 is applied to the end side 22 of the encoder wheel 20. In this embodiment, the encoder wheel 20 and/or the encoder contour 21 are composed, as is the winding head cover 16, of a non-magnetizable steel with the alloy composition $Fe_{rem}Cr_aNi_bMn_cC_dSi_eP_fS_gN_h$, where a, b, c, d, e, f, g and h are specified in percent by weight and 18≤a≤19; 12≤b≤13; 0≤c≤1.4; 0≤d≤0.055; 0≤e≤0.6; 0≤f≤0.04; 0≤g≤0.008 and 0≤h≤0.1.

FIG. 4 is a schematic view of a longitudinal section through a region of the rotor 2 according to a third embodiment. In this embodiment, the encoder wheel 20 is also embodied in one piece with the winding head cover 16. However, it can also be embodied as a separate part. The encoder contour 21 is embodied in this embodiment as an inwardly drawn region.

The rotor 2 also has a balancing element in the form of a balancing ring 23. The balancing ring 23 is arranged on the inside of the winding head cover 16 and is composed of a non-magnetizable steel with the alloy composition $Fe_{rem}Cr_aNi_bMn_cC_dSi_eP_fS_gN_h$, where a, b, c, d, e, f, g and h are specified in percent by weight and 18≤a≤19; 12≤b≤13; 0≤c≤1.4; 0≤d≤0.055; 0≤e≤0.6; 0≤f≤0.04; 0≤g≤0.008 and 0≤h≤0.1.

The balancing ring 23 is connected to the deep drawn part, which combines the functionalities of the winding head cover 16 and the encoder wheel 20, for example by means of rolling in, calking or pressing in. The floor or a shoulder in the deep drawn part can serve here as a stop for the balancing ring 23.

FIG. 5 shows a table with an alloy composition which can be used for various functional components of the rotor 2 according to one embodiment. Compared to known stainless steels, this alloy has a particularly high proportion of nickel and chromium.

It has become apparent that as a result the austenitic structure of the steel remains undamaged even after shaping. Therefore, the steel is non-magnetizable even after shaping and is particularly suitable for use in the rotor 2 owing to the low eddy current losses.

Although at least one exemplary embodiment has been presented in the preceding description, various changes and modifications can be made. The specified embodiments are merely examples and are not provided to limit the scope of validity, the possibility of application or the configuration in any way. Instead, the preceding description provides a person skilled in the art with a plan for implementing at least one exemplary embodiment, wherein numerous changes in the function and arrangement of elements described in an exemplary embodiment can be made without departing from the scope of protection of the appended claims and their legal equivalents.

LIST OF REFERENCE NUMERALS

1 Electric motor
2 Rotor
3 Stator
4 Pole tooth
5 Exciter winding
6 Groove-insulating paper
7 Groove
8 Groove wedge
10 Recess
11 Bulge
15 Winding head
16 Winding head cover
17 Central opening
18 Rotor shaft
19 Plastic compound
20 Encoder wheel
21 Encoder contour
22 End side
23 Balancing ring

What is claimed is:
1. A rotor for a rotating electric machine, the rotor comprising:
a rotor laminated core arranged on a rotor shaft, and at least one metallic functional component constructed from a material comprising:
   iron, and
   chromium in a proportion of between 18% and 19%, inclusive, by weight.

2. The rotor of claim 1, wherein the material of the at least one functional component also includes nickel in a proportion of between 12% and 13%, inclusive, by weight.

3. The rotor of claim 1, wherein the at least one functional component comprises a balancing element.

4. The rotor of claim 1, wherein the at least one functional component comprises an encoder wheel of a rotor position encoder.

5. The rotor of claim 1, wherein the rotor comprises a rotor of an externally excited synchronous machine and comprises:
   a plurality of pole teeth, each supporting an exciter winding; and
   grooves formed between each adjacent pair of the pole teeth.

6. The rotor of claim 5, wherein the at least one functional component comprises a winding head cover of each exciter winding.

7. The rotor of claim 5, wherein each functional component comprises a groove wedge arranged in a respective groove to close off the groove from an outside area.

8. The rotor of claim 5, wherein each exciter winding is surrounded by a casting compound.

9. The rotor of claim 5, wherein the grooves define cavities that are cast essentially completely with a casting compound.

10. A rotating electric machine, comprising:
   a rotor comprising:
      a rotor laminated core arranged on of rotor shaft, and
      at least one metallic functional component constructed from a material comprising:
         iron,
         chromium in a proportion of between 18% and 19%, inclusive, by weight.

11. The rotating electric machine of claim 10, wherein the material of the at least one functional component of the rotor also includes nickel in a proportion of between 12% and 13%, inclusive, by weight.

12. The rotating electric machine for of claim 10, wherein the at least one functional component of the rotor comprises a balancing element.

13. The rotating electric machine of claim 10, wherein the at least one functional component of the rotor comprises an encoder wheel of a rotor position encoder.

14. The rotating electric machine of claim 10, wherein the rotating electric machine comprises an externally excited synchronous machine, and wherein the rotor comprises:
   a plurality of pole teeth, each supporting an exciter winding; and
   grooves formed between each adjacent pair of the pole teeth.

15. The rotating electric machine of claim 14, wherein the at least one functional component rotating electric machine comprises a winding head cover of each exciter winding.

16. The rotating electric machine of claim 14, wherein each functional component rotating electric machine comprises a groove wedge arranged in a respective groove to close off the groove from an outside area.

17. The rotating electric machine of claim 14, wherein each exciter winding rotating electric machine is surrounded by a casting compound.

18. The rotating electric machine of claim 14, wherein the grooves rotating electric machine define cavities that are cast essentially completely with a casting compound.

* * * * *